No. 735,515. PATENTED AUG. 4, 1903.
J. W. HORNSEY.
HOT AIR FURNACE.
APPLICATION FILED APR. 17, 1902. RENEWED MAY 27, 1903.
NO MODEL. 2 SHEETS—SHEET 1.
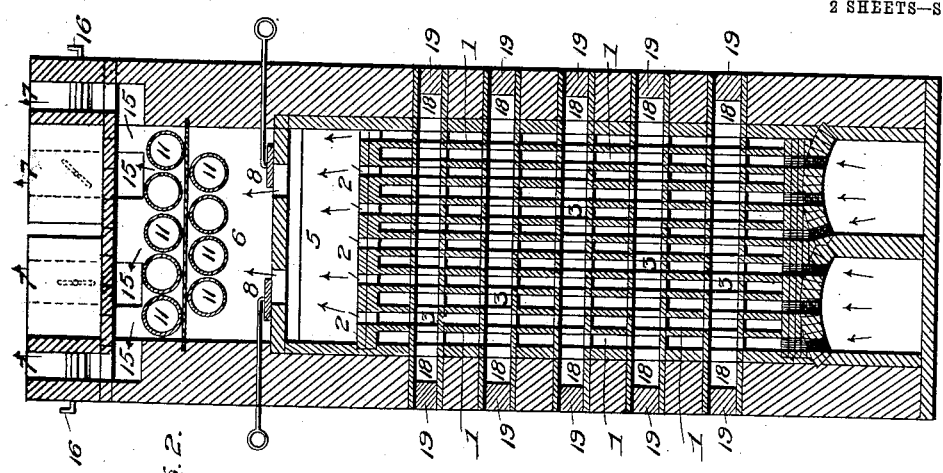
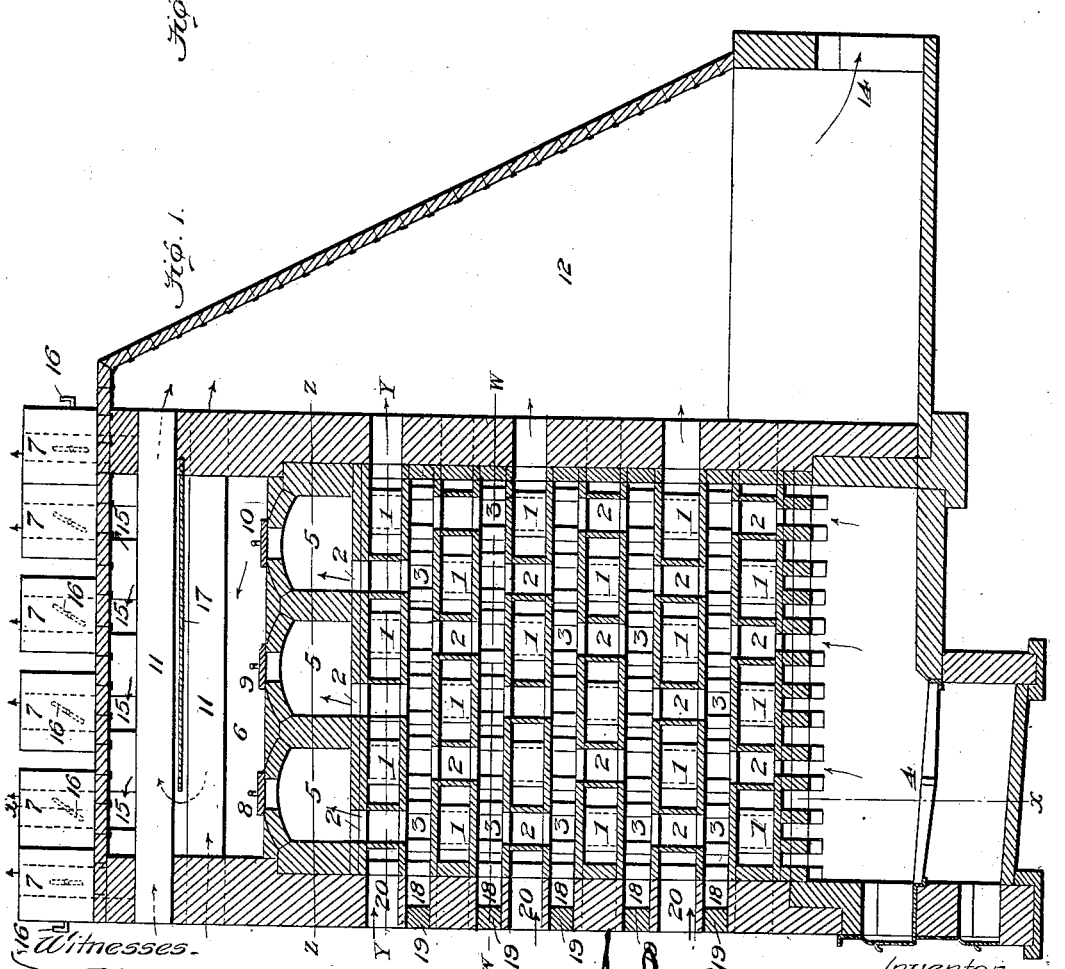

No. 735,515. PATENTED AUG. 4, 1903.
J. W. HORNSEY.
HOT AIR FURNACE.
APPLICATION FILED APR. 17, 1902. RENEWED MAY 27, 1903.
NO MODEL. 2 SHEETS—SHEET 2.
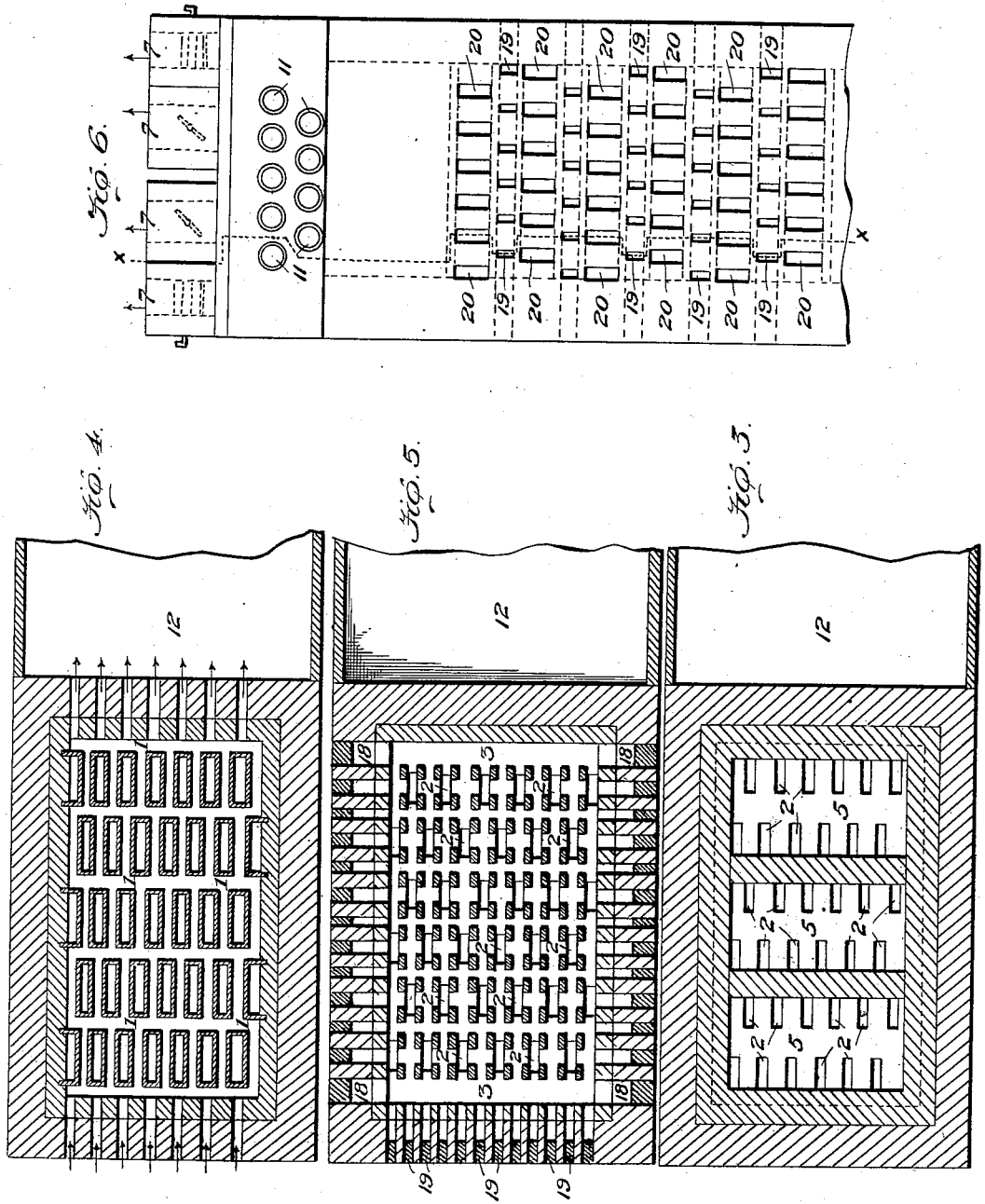

No. 735,515.

Patented August 4, 1903.

UNITED STATES PATENT OFFICE.

JOHN W. HORNSEY, OF CLEVELAND, OHIO, ASSIGNOR TO THE CROWN DRYER COMPANY, OF CLEVELAND, OHIO, A CORPORATION OF OHIO.

HOT-AIR FURNACE.

SPECIFICATION forming part of Letters Patent No. 735,515, dated August 4, 1903.

Application filed April 17, 1902. Renewed May 27, 1903. Serial No. 159,042. (No model.)

*To all whom it may concern:*

Be it known that I, JOHN W. HORNSEY, a citizen of the United States of America, residing at the city of Cleveland, in the county of Cuyahoga and State of Ohio, have invented certain new and useful Improvements in Hot-Air Furnaces, of which the following is a specification.

My present invention, which relates to hot-air furnaces, contemplates a certain improvement in the type of furnace patented to me May 7, 1901, No. 673,397, the said improvement having for its object the continuous operation of the furnace and consequent great economy in its use for drying and for heating, and in the claims the precise improvement will be specifically stated.

The accompanying drawings, read in connection with the following description, will enable any one skilled in the art to which my invention relates to understand its nature and to practice it in the form in which I prefer to employ it; but it will be understood that my invention is not limited to the exact construction and arrangement illustrated and described, as changes in the furnace structure might be made which would properly be within the scope and terms of the claims appended hereto.

Referring to the drawings, Figure 1 shows in vertical section my hot-air furnace embodying my present improvements, the section being taken on the dotted line $x\ x$ of Fig. 6 to show that the air-flues and the fire-spaces open at the air-inlet side of the furnace-wall and that the plugs 19 close the fire-spaces at their openings. Fig. 2 is a vertical transverse section of the same, taken on the line X of Fig. 1. Fig. 3 is a horizontal section taken on the line Z of Fig. 1, showing a plurality of heat-diffusing valve-controlled chambers supplementing the heat-storage flue structure. Fig. 4 is a like section taken through one of the horizontal circuitous air-passages on the line Y of Fig. 1, showing in section the vertical fire-flues. Fig. 5 is a like section taken through one of the horizontal fire-spaces on the line W of Fig. 1, showing the provision for cleaning these fire-spaces. Fig. 6 shows in elevation the arrangement of the wall-openings for the admission of the air into the heat-storage structure and the arrangement of the wall-openings for cleaning the fire-spaces.

The heat-storage structure is of fire-resisting material, within which air-passages 1 are formed by slabs arranged in horizontal tiers separated and supported by staggered walls forming vertical fire-flues 2, the walls of which pass successively through the tiers of the air-passages. Fire-spaces 3 are formed by and between the horizontal slabs, and into these fire-spaces the vertical fire-flues open successively through the tiers of slabs, whereby the fire-flues heat the air by radiation and form a heat-storage structure or reservoir, wherein and through certain passages of which air is caused to constantly pass in comparatively thin volumes independently of and crossing the flues for the products of combustion, the air in its passage extracting the heat radiated from the walls. In this construction of separate and independent passages and flues, the latter for the products of combustion and the passages for the air in thin volumes in contact with and between flue-walls, the heat is maintained at a high temperature and the air is rendered absolutely pure and of a high moisture-absorbing capacity.

In the construction shown the fire-box 4, which may be adapted for grate-fire, is preferably located directly beneath the heat-storage flue structure, so that the fire-flues of the latter open directly into the fire-box chamber for an updraft. This heat-storage structure is supplemented by a plurality of valve-controlled heat-retarding chambers 5, into which the fire-flues open and which are supplemented by a chamber 6, having a plurality of valve-controlled chimneys 7, whereby in operating conjointly these valved chambers the products of combustion are caused to be diffused through the circuitous fire-flues, and thereby effect a more uniform combustion of the fire products in the perfect diffusion of the heat through the staggered flues.

To secure the desired high temperature of the air, perfect combustion and the extraction of every atom of heat possible from the products of combustion are essential. To secure perfect combustion, high temperature, proper areas, a proper amount of air for combustion, and a thorough and complete commingling of the products of combustion and the air supplied for combustion are necessary.

Perfect combustion is obtained to the fullest possible extent in the heat-storage structure, through which the products of combustion are caused to pass from the furnace through a multiple of vertical flues which open into successive horizontal intersecting spaces which are common to all the products and within which they are commingled. The walls of these successive fire-spaces form also the walls of the successive air-passages, and the fire products pass into these shallow fire-spaces toward the exit and into a valve-controlled chamber or chambers, the functions of which are to diffuse the products of combustion within the staggered flue-passages, wherein the perfect combustion takes place.

To insure the complete extraction of the heat from the products of combustion, it is essential that all the radiating-surface be utilized, and to do this it is necessary that the products of combustion be thoroughly and completely diffused through the flue structure and retarded in their passage in such manner as to prevent their escape until as much of their heat as possible has been absorbed. For this purpose it is important that provision be made whereby perfect control may be had over the entrance and passage of the fire products into and through all the staggered flues and successive fire-spaces. The provision which I have shown for this purpose is a plurality of valve-controlled chambers 5, built up with, forming a part of the flue structure, and into which all its fire-flues open. The chambers are preferably provided with valves 8, 9, and 10 for controlling therefrom the products of combustion, and hence the diffusion of the draft through the heat-storage flue structure. In practice the number of such chambers will be governed by the size of the furnace. When the exits are made by two openings for each chamber, I prefer to use a pair of valves for each chamber, as in Fig. 2, as a means of control over the draft and diffusion through the heat-storage flue structure, the valves of each chamber being preferably operated from opposite sides of the furnace.

In operation it might be found that the products of combustion would have a greater tendency to rise through that part of the flue structure nearest the fire-box which, as shown, is beneath the valved exit 8, and in this case the fire products could be spread through all the flues of the structure by closing said valves 8 of the side chamber, partially opening the valves 9 of the middle chamber, and, if necessary, entirely closing the valves 10 of the other side chamber. By the plurality of chambers and by the opening and closing of their valves the passage of the products of combustion through the heat-storage structure may be diffused, retarded, and expedited, as may be desired, the result being the discharge from each of these valved chambers of the products of combustion at the same temperature at the same or in variable volumes.

As the fire-brick of which the flue structure is built is a poor conductor of heat, I find it advantageous to supplement the fire-brick radiating structure with a secondary radiator of metallic walls, and by so doing I can reduce the extent of the fire-brick radiating-surface. For such secondary radiator I prefer to employ a plurality of metal tubes 11, arranged within the chamber 6, supplementing the plurality of valved chambers, so that the fire products from the latter will pass around the metallic walls, which will absorb the heat and transmit it to air passing through said tubes. These tubes open at one of the side walls of the furnace-closure, their other ends opening into a hot-air-storage chamber 12 at the other side wall.

In the construction shown the products of combustion will leave the furnace at approximately 2,500° to 2,700° Fahrenheit and can be allowed to pass out of the valve-controlled openings of the chambers 5 at any desired temperature, generally about 800° Fahrenheit. There is therefore a coöperative relation between the valved draft-controlling chambers 5 of the fire-brick flue-radiator and the metallic radiator. The products of combustion on leaving the fire-brick radiator will pass into and gather in the chambers 5, the valves thereof holding the heat and allowing it to pass out in regulated volumes, and in this function these chambers serve to retain more or less of the heat in contact with and over the surface at which the heat leaves the flue structure, whereby these valved chambers are caused to form a sort of oven, keeping the top air-passage hot, while protecting the walls of the metallic radiator from heat which would melt them.

Referring to Fig. 1, it will be seen that the air-passages are open at both the closure-walls and that one of said walls is inclosed, so that all these passages open into this closure, which is thereby made a hot-air-storage chamber 12, from which air is supplied for use and may be drawn therefrom by a suction-fan placed in an opening at 14 and which also draws the air through the staggered passages of the heat-storage structure. It will be noted that the air is drawn by the suction-fan into and through the tubes 11, and its passage from the tubes is retarded by the valves 13 in order that the air may be highly heated before passing into the storage-chamber, and it is in this chamber that the air is received at varying temperatures and commingled and from which it is taken at a uniform temperature. In this arrangement of the heat-economizer tubes it is important to note that the considerable area of the roof of the draft-regulating chamber or chambers 5 will radiate a large amount of heat that will be utilized to the fullest extent to heat the metallic air-heating tubes. Another feature of importance is the provision of a plurality of chimney-flues 7 in the closure-walls opening by flues 15 into the chamber of the metallic radiator, the chimneys rising from the closure-walls and surrounding this chamber and each provided with a damper 16, whereby the products of combustion may be retarded and retained within the chamber of the metallic radiator to insure the absorption of the heat by the tubes as completely as possible and to control and regulate the draft from the said chamber, and thereby control and regulate the draft through the valve-controlled chambers. By having a plurality of short chimneys each controlled independently by a valve the products of combustion may be carried out any one or more of the said chimneys at the same temperature and in this way effect a uniform diffusion of the fire products around the walls of the metallic radiator.

The valves of chambers 5, which supplement the flue structure, and the dampers in the chimney-flues may, if desired, be so adjusted as to cause all of the products of combustion to pass out of the fire-brick flue structure through any one or more of the valve-controlled chambers 5 and out of the metallic radiator-chamber through any number of the chimneys, the draft being distributed on all sides of this secondary chamber as may be desired. The object of this method of operation of the chimney-valves is to force the products of combustion to pass for a greater distance around and along the metallic tubes, thus giving a greater opportunity for the absorption of heat.

I have shown a plurality of rows of tubes between the valve-controlled chambers 5 and the valve-controlled chimneys, and I may use a baffle-plate 17 between the rows of tubes, standing out from the closure-wall and extending nearly to the opposite closure-wall, so that the products of combustion passing, say, through the valve-controlled opening 10 of the chamber 5 would then pass to the left around and along the lower row of tubes beneath the baffle-plate to the end of the latter, from which they would rise, pass around and along the upper row of the tubes, and make their exit through the chimneys above the valve 10.

The employment of a plurality of controllable short chimneys surrounding and opening into a chamber common to all and through which the draft of the flue structure is effected is an important provision in affording facility to work the furnace with a draft suited to the flue structure and the desired force of the draft.

I have stated as an important advantage of the furnace that it can be operated continuously; but this is only rendered possible by provision whereby certain of the flues may be kept free from choking. In operating the furnace I have found that the vertical staggered fire-flues 2 are self-cleaning and that the horizontal fire-spaces 3 between the floor-slabs become filled with ashes and stop the draft of the furnace. These fire-spaces are formed by blocks arranged in parallel rows, as in Figs. 1 and 5, which separate and support the slabs, and between these rows of blocks the fire-flues open in staggered relation between the slabs. The fire products therefore as they pass from the vertical flues impinge against the slabs above and are deflected horizontally, and it is this interruption of the vertical direction of the fire products which causes the deposit of ashes within the fire-spaces between the flue-openings. I therefore provide access to these fire-spaces by openings 18 in the closure-walls coincident with the spaces between the rows of blocks and coincident with the flue-openings. In the other right-angle closure-walls openings 18 are provided coincident with the fire-spaces between the blocks and with the said flue-openings. This arrangement of the blocks in their relation to the rows of flue-openings gives a clear way for introducing a scraper through the closure-wall openings and through the fire-spaces across the fire-flue openings 2 to cause the collected ashes to be pushed and scraped in two directions between the rows of blocks over the flue-openings, through which the ashes fall successively from one fire-space to the other and finally into a chamber common to all the flues, as in Figs. 1 and 5.

The wall-openings 18 are provided with suitable closures, as by plugs or bricks 19 temporarily set in, and can be removed when fire-spaces are to be cleaned.

Referring to Fig. 3, rows of fire-flues are seen opening into the chambers 5, which are within the closure-walls, and it is from these walls that the chimneys rise and from which the roof extends from the base of the chimneys and forms the closure for the hot-air-storage chamber, and beneath the roof the chimney-flues open into the secondary radiator-chamber. In Fig. 5 is seen the horizontal straight passages for the products of combustion, into which open the vertical passages for the products of combustion, whereby the ash deposits in these straight passages may be dislodged and carried to and through the vertical flues successively from one straight passage to another to a base-chamber common to all the flues, the dislodgment being made in lines at right angles to each other between the rows of blocks. For this purpose, it will be noted, referring to Fig. 5, the opposite side wall-openings are coincident with each other and with a clear way crossing the floor of the fire-space, so that a rake introduced through the side and end openings will pass between the rows of blocks in pulling and pushing the ashes and soot over the flue-openings. In this way the cleaning of the fire-spaces is commenced at the top fire-space and carried on successively downward in each fire-space, and for this purpose (looking at Fig. 6) each fire-space is seen provided with a wall-opening arranged in line between each row of blocks. This is the vital feature by which the furnace may be kept working. Moreover, it is this arrangement of the openings by which the soot and ashes are caused to be emptied from fire-spaces arranged one above the other successively from the top fire-space into a base fire-space.

While I have shown the vertically-staggered fire-flues opening directly into the chamber of the fire-box, obviously the fire-box may be arranged outside of the flue structure.

I have shown and described a construction of furnace employing an updraft, but do not wish to be confined to this direction of the draft.

I claim—

1. An air-heating furnace, comprising a fire-brick structure having a plurality of vertical fire-flues, a fire-box into which said flues open, horizontal fire-spaces arranged in tiers, between the floors of which, the fire-flues open, horizontal air-passages between the floors of the fire-spaces, and a plurality of openings in the walls between the floors of each fire-space whereby the ashes may be delivered successively from the fire-spaces into the fire-box.

2. An air-heating furnace, comprising a fire-brick structure having a plurality of vertical fire-flues arranged in rows in alinement sidewise and endwise in relation to the structure-walls, a fire-box into which all the fire-flues open, horizontal fire-spaces arranged in tiers, between the floors of which, the vertical fire-flues open, horizontal air-passages between the floors of the fire-spaces, a plurality of openings in the side and end walls arranged between the floors of each fire-space to provide for cleaning the latter in two directions and causing the ashes to be delivered from the horizontal top fire-flue successively into the fire-flues below and thence into the fire-box.

In testimony whereof I affix my signature in presence of two witnesses.

JOHN W. HORNSEY.

Witnesses:
A. E. H. JOHNSON,
GUY H. JOHNSON.